March 5, 1957  E. W. COWAN  2,784,310
PULSE WIDTH SELECTING FILTER
Filed Jan. 8, 1946  3 Sheets-Sheet 1

INVENTOR
EUGENE W. COWAN
BY
ATTORNEY

March 5, 1957 E. W. COWAN 2,784,310
PULSE WIDTH SELECTING FILTER
Filed Jan. 8, 1946 3 Sheets-Sheet 3

INVENTOR
EUGENE A. COWAN
BY *M. O. Hayes*
ATTORNEY.

Patented Mar. 5, 1957

2,784,310

PULSE WIDTH SELECTING FILTER

Eugene W. Cowan, Pasadena, Calif., assignor, by mesne assignments, to the United States of America as represented by the Secretary of the Navy Application January 8, 1946, Serial No. 639,895

7 Claims. (Cl. 250—27)

This invention relates to delay lines and more particularly to a delay line filter which rejects video pulses of greater than a predetermined duration.

Long blocks of signal return are characteristic of sea return and ground clutter and result in saturation of radar system indicators. Such long blocks of signals make it extremely difficult, if not impossible, to detect targets through them.

The present invention provides a filter in a radar receiver for rejection of video pulses longer than a predetermined duration such as from sea return or ground clutter. However, it passes pulses having durations less than a predetermined value without appreciably affecting the minimum detectable signal and without changing the relative peak amplitudes of signals.

An object of this invention is to provide a filter circuit for rejection of pulse echo video signals to a radar indicator which are longer than a predetermined duration.

Another object is to provide a method for suppressing long blocks of signals, such as from sea return or ground clutter which interfere with target detection.

These and other objects and features of this invention will become apparent upon a consideration of the following detailed description when taken together with the accompanying drawings, the figures of which illustrate a typical embodiment of this invention:

Figure 1:
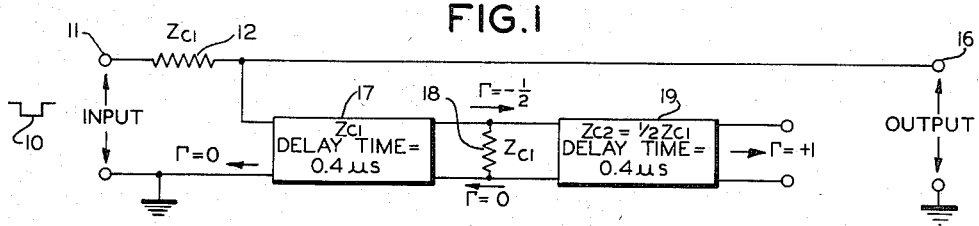
Fig. 1 is a block diagram of a double-delay line filter.

In Fig. 1, the input pulse 10 is applied between input terminal 11 and ground. Resistor 12 connects between input terminal 11 and output terminal 16 and provides a characteristic impedance, $Z_{c1}$, termination of delay line 17 at its sending end. Line 17 is terminated at its far end by resistor 18 whose resistance also equals $Z_{c1}$, the characteristic impedance of line 17. Resistor 18 also terminates delay line 19 at its sending end. Delay line 19 has a characteristic impedance $Z_{c2}$, which equals one half of $Z_{c1}$, and is open-circuited at its far end.

The wave 10 traveling down line 17 sees a termination of ⅓ $Z_{c1}$ resulting from the parallel impedance of resistor 18 and line 19. This gives a reflection coefficient, Γ, of −½ for a wave traveling to the right at the far end of line 17. A wave traveling to the right in line 19 sees an open circuit at the far end which gives a reflection coefficient of +1. A wave returning to the left from line 19 sees resistor 18 and line 17 in parallel and thus sees the characteristic impedance, $Z_{c2}$, of line 19 at the sending end which gives a reflection coefficient of 0. As the wave continues to the left in line 17 it sees resistor 12 providing a characteristic impedance termination of line 17 at its sending end or again a reflection coefficient of 0, so that there are no reflections.

Figure 2:
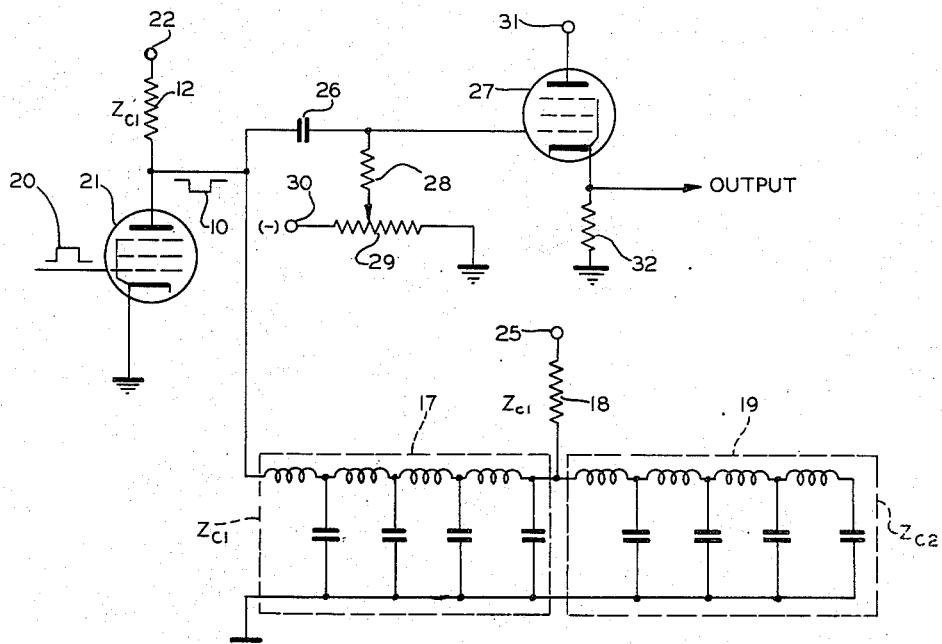
Fig. 2 illustrates the circuit of a double-delay line filter designed to pass pulses less than 1.6 micro-seconds long.

In Fig. 2, the detailed circuit is shown of the block diagram of Fig. 1. Positive signal pulses 20 are injected at the control grid of tube 21, the cathode of which is grounded. Resistor 12 is the plate resistor of tube 21 and ties the plate to a positive potential connected at point 22. The output pulses at the plate of tube 21 are the negative pulses 10 which become the input to the delay line filter. The pulses 10 are applied to delay line 17 which connects to delay line 19. At the junction of delay lines 17 and 19, resistor 18 ties to a positive potential connected at point 25 which is the same as the potential at point 22. The pulses 10 combined with the pulses that are reflected from the delay lines are coupled by capacitor 26 to the control grid of tube 27. The control grid of tube 27 is biased to cut-off through resistor 28 which connects to a slider arm on potentiometer 29. Potentiometer 29 connects between ground and a source of negative potential applied at point 30. The plate of tube 27 connects to a positive potential applied at point 31 and the cathode is grounded through resistor 32. The output pulse is taken between the cathode of tube 27 and ground.

Figure 3:
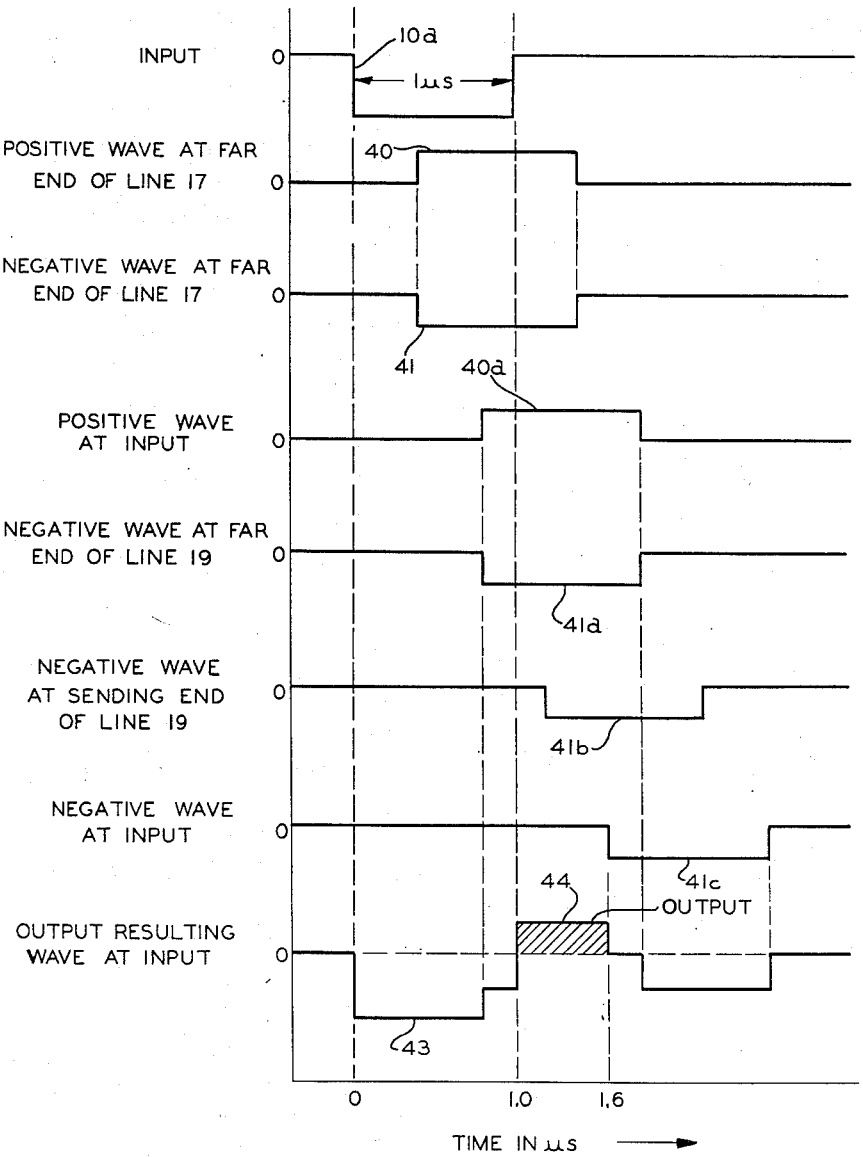
Fig. 3 illustrates the wave forms at various points of the circuit of Fig. 2 with an input pulse less than 1.6 micro-seconds long.
Figure 4:
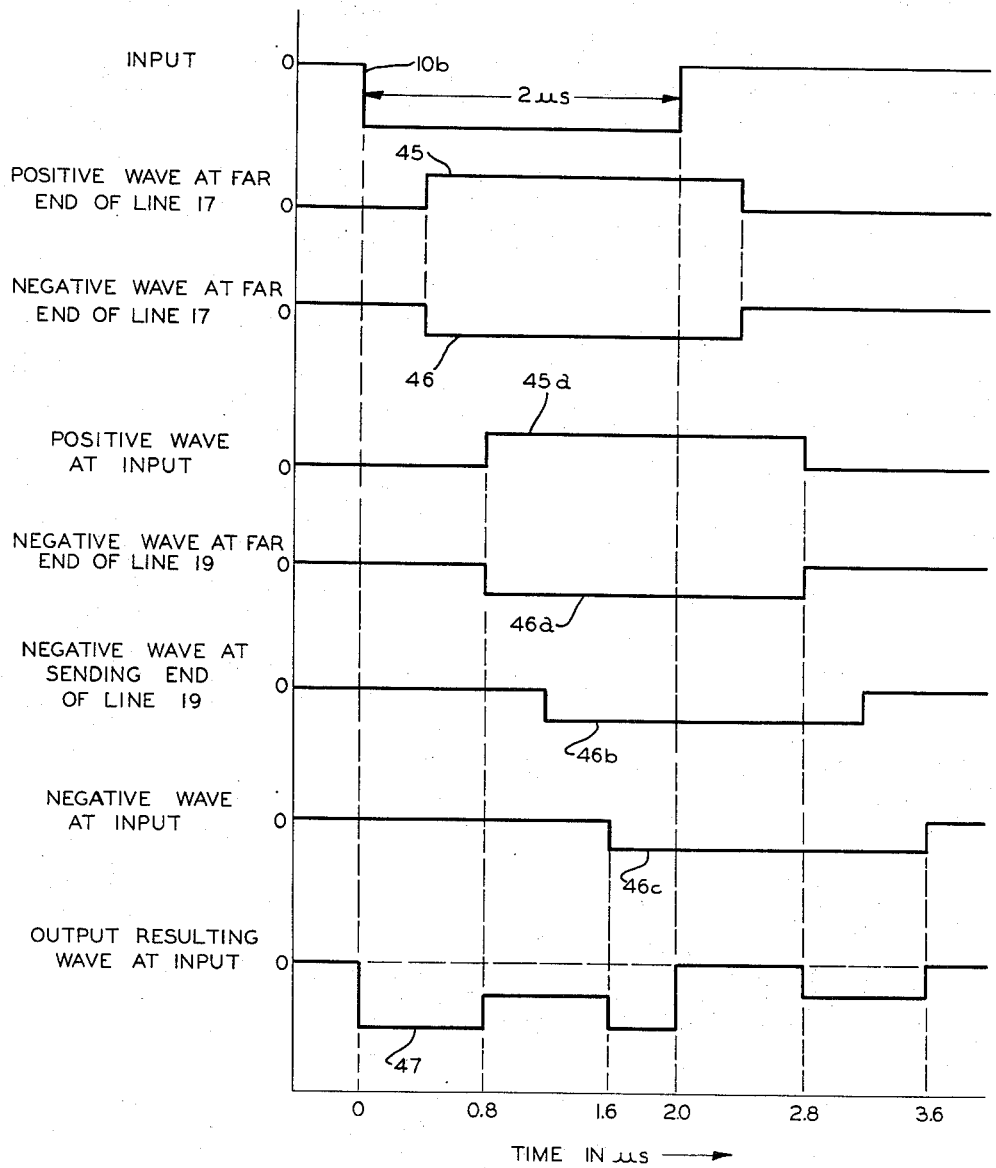
Fig. 4 illustrates the wave forms at various points of the circuit of Fig. 2 with an input pulse greater than 1.6 micro-seconds long.

The operation of the delay line filter will be readily understood by reference to the wave forms of Figs. 3 and 4 in connection with the circuit of Figs. 1 and 2. The delay time of lines 17 and 19 for illustrative purposes is taken as 0.4 of a micro-second for each line and results in rejection of pulses longer than 1.6 microseconds. In Fig. 3, the input pulse $10a$ is taken as 1μs. long. In 0.4μs. the leading edge of wave 10 reaches the far end of line 17 where it has a reflection coefficient of −½. Thus, there is a reflected positive wave 40, one-half the amplitude of the input wave $10a$. There is also a negative wave 41, one-half the amplitude of the input wave $10a$, which appears at the sending end of line 19.

The reflected positive wave 40 reaches the input at the sending end of line 17 at $t=0.8\mu s$. as shown by wave $40a$. At the same time the negative wave 41 reaches the far end of line 19 as shown by wave $41a$, where it has a reflection coefficient of +1 and is reflected without reversal of voltage. At $t=1.2\mu s$., the negative wave $41a$ has been reflected to the sending end of line 19 as represented by wave $41b$, continues to see a characteristic impedance termination while traveling across into line 17, and reaches the input of line 17 at $t=1.6\mu s$. as shown by wave $41c$. Adding the waves appearing at the input, 10, $40a$ and $41c$, results in the output wave 43 of which only the positive section 44 provides output from tube 27 by bringing the control grid above cut-off.

In like manner, the wave forms of Fig. 4 illustrate how with a pulse signal longer than 1.6μs. there is no positive output from the filter, and, therefore, no output from tube 27. The input pulse $10b$ is 2μs. long. Wave 45 is the positive wave reflected from the far end of line 17, and wave 46 is the negative wave which continues down line 19. The reflected positive wave reaches the input at the sending end of line 17 as shown in wave $45a$. At the same time, the negative wave 46 reaches the far end of line 19 as wave $46a$. It is then reflected to the sending end of line 19 as wave $46b$ and passes back up line 17 to the input as wave $46c$. The resulting output wave 47, the summation of $10b$, $45a$, and $46c$, has no part which is positive and hence sufficient to drive the control grid of tube 27 above cut-off. Therefore, tube 27 remains cut off and there is no output from the filter circuit.

Although there is shown and described only a certain specific embodiment of a delay line filter circuit, the many modifications possible thereof will be readily apparent to those skilled in the art. Therefore, this invention is not to be limited except insofar as is necessitated by the prior art and the spirit of the appended claims.

What is claimed is:

1. A circuit for rejecting all input video pulses longer than a predetermined duration comprising, a first delay line terminated at its sending end by its characteristic impedance and at its far end by one-third its characteristic impedance, and a second delay line connected to receive transmitted pulses from said far end of said first line, said second line having half the characteristic impedance of said first line, being terminated at its sending end by its own characteristic impedance, and being open-circuited at its far end, said delay lines having equal delay times which total one-half said predetermined duration.

2. A pulse filter comprising, a first electron tube adapted to be fed a series of input positive pulses between its control grid and cathode, a plate resistor and a source of plate potential for said tube, a first delay line having a predetermined delay time connected between plate and cathode of said tube, said plate resistor terminating said first delay line in its characteristic impedance at its sending end, a resistor whose impedance is equal to the characteristic impedance of said first delay line connecting the far end of said first delay line to said source of plate potential, a second delay line connected across said far end of said first delay line and having the same delay time and half the characteristic impedance of said first delay line, a second electron tube, a cathode resistor and a source of plate potential for said second tube, a capacitor coupling the plate of said first tube to the control grid of said second tube, a source of negative potential for biasing said control grid to cut-off, a potentiometer connected between said negative source and ground, and a grid leak resistor connecting the slider arm of said potentiometer and said control grid of said second tube, said second tube remaining biased to cut-off except when any one of said series of input pulses to said first tube is shorter than twice the sum of said delay times of said delay lines so that the sum of the pulse at the plate of said first tube due to the said one input pulse plus the pulses reflected to the plate of said first tube from said delay lines results in a positive pulse to overcome said bias at the grid of said second tube to produce an output pulse across said cathode resistor.

3. A circuit for rejecting applied pulses longer than a predetermined duration comprising, first and second delay lines, the characteristic impedance of said second delay line being a fraction of that of said first delay line, means including a pulse input circuit for terminating the input side of said first delay line in the characteristic impedance thereof, means including said second delay line for terminating the output side of said first delay line in a fraction of the characteristic impedance thereof and an open circuit in the output side of said second delay line, the total delay time of said first and said second delay lines being equal to a fraction of said predetermined duration.

4. A pulse filter comprising, a first electron tube, means for applying input pulses to said electron tube, means for deriving output pulses from said electron tube, a first delay line having its characteristic impedance substantially matched to that of said last-mentioned means, a second delay line having a characteristic impedance equal to one-half that of said first delay line and providing a delay time equal to that of said first delay line, and a second electron tube also connected to the output circuit of said first electron tube, said second electron tube being biased to cut-off, pulses in the output circuit of said first electron tube being sufficient in amplitude to overcome the bias of said second electron tube except when applied pulses are of more than a predetermined duration.

5. A pulse filter comprising, first and second electron tubes, the output of said first electron tube being coupled to the input of said second electron tube, said second electron tube being biased to cut off, means coupled in shunt with said second electron tube for extracting output pulses from said first electron tube, said means effectively absorbing all pulses longer than a predetermined duration and returning pulses shorter than said predetermined duration to overcome the bias on said second electron tube for passage therethrough.

6. A pulse filter comprising, a first electron tube, means for applying input pulses thereto, a first delay line having a predetermined delay time coupled and substantially matched in characteristic impedance to the output circuit of said first electron tube, a second delay line coupled to said first delay line and having a similar delay characteristic but a characteristic impedance equal to one-half that of said first delay line, a second electron tube, means for coupling the output of said first electron tube to the input of said second electron tube, means for biasing said second electron tube to cut-off and means for overcoming said bias by the simultaneous application of pulses of positive polarity directly from said first electron tube and positive pulse portions from said delay line combination.

7. A pulse filter comprising, input terminals, means arranged across said terminals for delaying the passage of an input pulse, means for reversing the polarity of part of said delayed pulse and reflecting said part to said input terminals, means for further delaying the unreversed part of said delayed pulse and reflecting it to said input terminals, said delaying means comprising elements for providing a predetermined time delay in passing pulses applied thereto and said reversing means comprising elements for reversing the polarity of portions of pulses applied thereto and means for summing all said pulses at said input terminals to pass only those pulses of duration shorter than a predetermined value.

References Cited in the file of this patent
UNITED STATES PATENTS

| | | |
|---|---|---|
| 2,212,173 | Wheeler | Aug. 20, 1940 |
| 2,265,986 | Blumlein | Dec. 16, 1941 |
| 2,266,154 | Blumlein | Dec. 16, 1941 |
| 2,307,375 | Blumlein et al. | Jan. 5, 1943 |